United States Patent Office 2,813,087
Patented Nov. 12, 1957

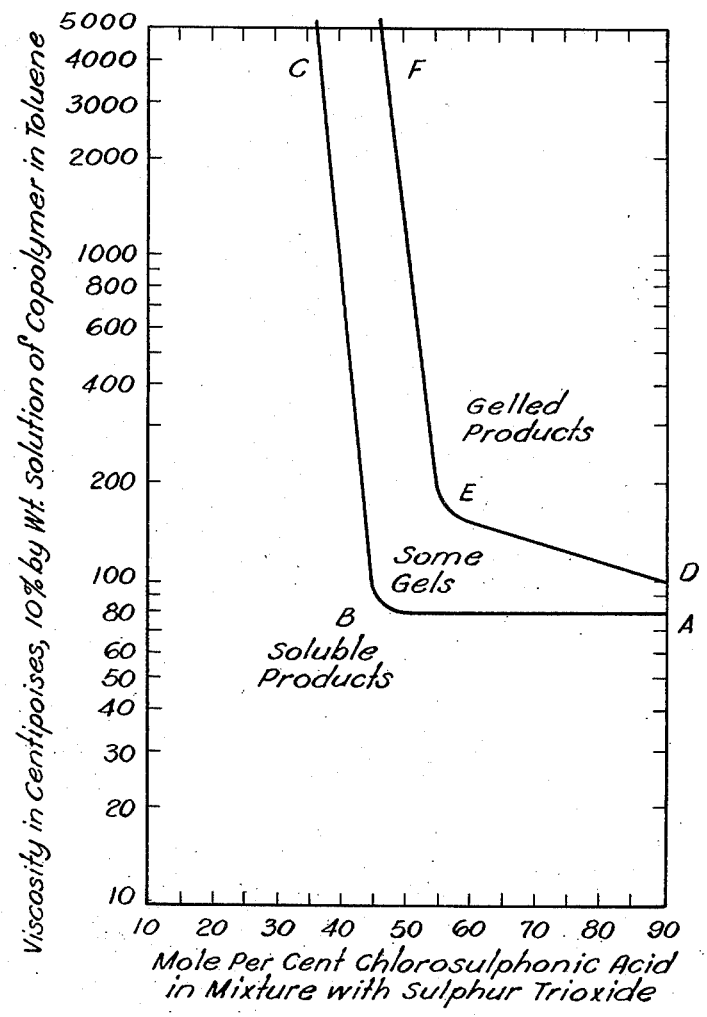

2,813,087

PREPARATION OF WATER-SOLUBLE SULFONATION PRODUCTS FROM POLYMERS OF AR-VINYLTOLUENE AND ACRYLONITRILE

Harold H. Roth, Bay City, Mich., assignor to The Dow Chemical Company, Midland, Mich., a corporation of Delaware Application April 14, 1955, Serial No. 501,340

5 Claims. (Cl. 260—79.3)

This invention concerns an improved method for the preparation of water-soluble, non-gelled sulfonates of polymers of ar-vinyltoluene containing from about 2 to about 10 percent by weight of acrylonitrile chemically combined therein. It pertains more particularly to the sulfonation of certain of such polymers by reaction with chlorosulfonic acid-containing sulfonation agents in the presence of liquid sulfur dioxide as a reaction medium.

It is known that the resin sulfonates obtained by sulfonating polystyrene, or any of a variety of other solid thermoplastic polymers of alkenylaromatic compounds, vary widely in properties, e. g., from being solid, water-insoluble materials to being gummy masses that are also insoluble, or only partially soluble, in water, to being non-gummy materials that are partially or completely soluble in water, depending on the conditions under which the sulfonation is carried out. Sulfonates of polystyrene have heretofore been prepared by dissolving polystyrene in a liquid polychlorinated aliphatic hydrocarbon such as carbon tetrachloride, or chloroform, and treating the solution with a highly reactive sulfonation agent such as chlorosulfonic acid. When operating in such manner, the properties of the product, e. g., the ease or completeness with which it can be dissolved or dispersed in water and its effectiveness in increasing the viscosity of water to which it is added, vary considerably with slight changes in one or more of the reaction conditions such as the kind or proportion of sulfonation agent, the order or rate of mixing the starting materials, and the reaction temperature. For these reasons, it is difficult, even when operating on a laboratory scale, to sulfonate successive batches of a polymer and obtain the same quality of sulfonated product. The difficulty of reproducing the results becomes greater as the quantity of material handled is increased, e. g. from laboratory amounts to a commercial scale. Many of the erratic results that have been obtained are attributed to occurrence of side reactions such as a reaction between a portion of the sulfonation agent and the polychlorinated aliphatic hydrocarbon used as a reaction medium, cleavage of the polymer molecules, and formation of sulfone-type cross linkages between the polymer molecules. In addition to the difficulties just mentioned, the sulfonated polymers usually contain ionizable impurities such as unconsumed sulfonation agent, sulfuric acid, or hydrochloric acid, and, in some instances, inorganic salts such as sodium sulfate or sodium chloride, and extra steps are required for removal of the impurities.

In a copending application, Serial No. 375,283, filed August 19, 1953, of which this is a continuation-in-part, it is disclosed that there are a number of solid thermoplastic polymers composed principally of alkenylaromatic compounds, e. g., styrene, or ar-vinyltoluene, that can satisfactorily be sulfonated with liquid sulfur trioxide as the sulfonation agent in the presence of liquid sulfur dioxide as a medium to obtain water-soluble sulfonated resin products.

It was further stated in that application that use of liquid sulfur dioxide as the sulfonation medium is advantageous in that sulfur dioxide is inert to the sulfur trioxide and that the sulfonated resin product precipitates therefrom leaving most, if not all, of the impurities, e. g., unconsumed sulfur trioxide, dissolved in the liquid sulfur dioxide which may be drained or washed from the product to obtain the latter directly in a form of good purity. Any liquid sulfur dioxide retained on the surfaces of the product is readily removed by vaporization.

The solid, thermoplastic alkenylaromatic resins that, according to the aforementioned copending application, can be reacted with sulfur trioxide in the presence of liquid sulfur dioxide as the reaction medium to form water-soluble resin sulfonates are ones containing a total of at least 60 percent by weight of at least one chemically combined monoalkenylaromatic compound having the generic formula:

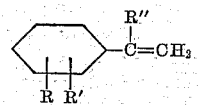

wherein R, R' and R" independently represent members of the group consisting of hydrogen and lower alkyl radicals, especially the methyl radical, and which have present in the resin molecule a functional group that renders the resin soluble, or readily dispersible, in liquid sulfur dioxide. The criterion stated therein was that any alkenylaromatic resin that can, by moderate stirring, be dissolved, or dispersed, in liquid sulfur dioxide to form a clear or cloudy liquid body free from a distinct, separate layer or precipitate of resinous material can satisfactorily be sulfonated by the method of that application and that such resins containing 60 percent by weight or more of an alkenylaromatic compound can be sulfonated with sulfur trioxide to obtain water-soluble resin sulfonates.

Examples of suitable resins as given in that application include copolymers of styrene, ar-vinyltoluene, ar-ethylstyrene and/or α-methylstyrene containing at least 60 percent by weight of at least one such alkenylaromatic compound and up to 40 percent by weight of another copolymerizable material such as acrylonitrile, ethyl methacrylate, sulfur dioxide, maleic anhydride, methyl methacrylate, ethyl acrylate or methyl isopropenyl ketone.

Among the copolymers indicated in that application to be preferred are the sulfur dioxide-dispersible copolymers of ar-vinyltoluene and acrylonitrile containing from 2 to 30 percent by weight acrylonitrile.

It has now been found that certain solid, thermoplastic copolymers of ar-vinyltoluene and acrylonitrile containing from about 2 to about 10 percent by weight acrylonitrile can be satisfactorily sulfonated by reaction with chlorosulfonic acid-containing sulfonation agents in the presence of liquid sulfur dioxide as a medium to obtain water-soluble sulfonated resin products. By "water-soluble" it is meant that the sulfonated resins can be dissolved, or dispersed by stirring, directly in water to form a substantially homogeneous liquid body, e. g., a true or a colloidal solution thereof. By "ar-vinyltoluene" is meant one or more of the isomers o-methylstyrene, m-methylstyrene, and p-methylstyrene.

Specifically, it has now been found that water-soluble resin sulfonates can be obtained by sulfonating certain copolymers of from 90 to 98 percent by weight ar-vinyltoluene and correspondingly from 10 to 2 percent of acrylonitrile chemically combined therein, in the presence of liquid sulfur dioxide as a sulfonation medium, by employing sulfonation agents that contain appreciable proportions of both chlorosulfonic acid and sulfur trioxide, e. g., from 10 to 90 mole percent chlorosulfonic acid and correspondingly from 90 to 10 mole percent sulfur trioxide.

Such a mixed sulfonation agent is often advantageous over sulfur trioxide alone as a sulfonation agent. For example, from a particular copolymer resin starting material, the resin sulfonates that are obtained by using chlorosulfonic acid-containing sulfonation agent generally have a greater effect in thickening water solutions than do those resin sulfonates that are obtained from the same starting resin by using sulfur trioxide alone as the sulfonation agent. Furthermore, in most instances, an increase in the proportion of chlorosulfonic acid relative to sulfur trioxide in the sulfonation agent usually results in an increase in the water-thickening power of the resin sulfonates that are obtained from a particular copolymer starting material.

The mixed sulfonation agents, i. e., mixtures of chlorosulfonic acid and sulfur trioxide, are also advantageous over chlorosulfonic acid alone as a sulfonation agent. When chlorosulfonic acid alone is employed as a sulfonation agent, e. g., for sulfonating polystyrene, difficulties are often encountered in making water-soluble sulfonate products. Careful selection and control of the sulfonation conditions are required in order to avoid formation of water-insoluble sulfonated resins, even when experiments employing chlorosulfonic acid as the sulfonation agent are carried out on laboratory scale. Avoidance of formation of the insoluble resin sulfonates becomes more difficult as the scale of production is increased.

In contrast, it has now been discovered that certain copolymers of ar-vinyltoluene and acrylonitrile can readily be sulfonated with mixtures containing from 10 to 90 mole percent chlorosulfonic acid and correspondingly from 90 to 10 mole percent sulfur trioxide, in the presence of liquid sulfur dioxide as a reaction medium, to obtain water-soluble resin sulfonates.

The copolymers of ar-vinyltoluene and acrylonitrile that are suitable for this purpose are those solid, thermoplastic copolymers containing from about 2 to about 10 percent by weight of acrylonitrile chemically combined therein that are substantially non-crosslinked, dispersible in liquid sulfur dioxide to form a clear or cloudy liquid body free from a distinct, separate layer or precipitate of resinous material, and that have average molecular weights that are not in excess of maxima that are related to the composition of the chlorosulfonic acid sulfonation agent.

In general, the greater the molecular weight of the polymeric resin starting material that is employed in a given sulfonation process, the greater is the viscosity of a standard, e. g. a 0.5 weight percent, water solution of the sulfonate that is obtained therefrom. Also, an increase in the proportion of chlorosulfonic acid relative to sulfur trioxide in mixtures thereof usually used for the sulfonation of a particular resin usually results in an increase in the viscosity of an aqueous solution of the sulfonated resin, e. g. in the above-mentioned standard concentration.

In the present method, in order to obtain water-soluble, non-gelled resin sulfonates when employing sulfonation agents that contain from about 50 to 90 mole percent chlorosulfonic acid, it is preferable, but not always necessary, to employ as starting material a copolymer of ar-vinyltoluene and acrylonitrile whose molecular weight is such that a solution of the copolymer in nine times its weight of toluene has a viscosity at a temperature of 25° C. that is not greater than about 80 centipoises. When the sulfonation agent contains from 10 to about 30 mole percent chlorosulfonic acid, there is no known limit to the molecular weight of a starting copolymer that is suitable for making soluble products. When the proportion of chlorosulfonic acid in the sulfonation agent increases from about 30 to about 50 mole percent, the maximum molecular weight of copolymers that are preferred for making water-soluble sulfonate products decreases sharply to one that is equivalent to a 10 percent solution viscosity of about 80 centipoises (viscosity at 25° C. of a solution of the polymer in nine times its weight of toluene).

The single figure of the drawing shows these relationships in graphical fashion. The region beneath the line ABC relates to the preferred, soluble, non-gelled sulfonates. For any particular mole percent chlorosulfonic acid in the sulfonation agent, the corresponding point on line ABC represents the maximum 10 percent solution viscosity, i. e., the viscosity in centipoises at 25° C. of a solution in nine times its weight of toluene, of copolymers that are preferred for making soluble, non-gelled sulfonates. The region between lines ABC and DEF represents combinations of starting copolymer resins and sulfonation agents whereby products are obtained that generally contain a substantial proportion of water-soluble material but that often contain some gels. The region above line DEF represents combinations of starting copolymer resins and sulfonation agents that usually produce gelled products.

In practice of the present method, the copolymer starting materials and the chlorosulfonic acid-containing sulfonation agents are selected from those represented by the region to the left of, and below, line DEF, preferably line ABC, of the accompanying drawing.

The sulfonation is accomplished at temperatures not higher than 40° C., e. g., between −40° and 40° C. and usually between −10° and 30° C., by admixing a total of at least 0.7, usually between about 0.8 and about 2 and preferably between about 1.2 and about 1.6, molecular equivalent weights of sulfonation agent with a dispersion in liquid sulfur dioxide of an amount of the ar-vinyltoluene-acrylonitrile copolymer resin having a total of one molecular equivalent weight of monomeric compounds chemically combined therein. Temperatures below 0° C. are usually preferred when the sulfonation agent contains a large proportion, e. g., more than about 50 mole percent, chlorosulfonic acid.

The liquid sulfur dioxide is usually used in proportion such that the reaction mixture contains 5 weight percent or less, e. g., from 0.5 to 3 percent, of the resin sulfonate. A portion of the sulfur dioxide is used to prepare a substantially homogeneous dispersion of the resin starting material, which dispersion usually contains 10 weight percent or less, e. g., from 1 to 5 percent, of the resin. Another portion of the sulfur dioxide can be used to dilute the sulfonation agent, e. g., by adding thereto an equal volume or more of liquid sulfur dioxide, thereby forming a solution containing from about 1 to about 10, preferably from about 3 to about 5, percent by weight of the sulfonation agent, before admixing the same with the resin starting material. Still another portion of the sulfur dioxide is usually placed in the reactor before feeding in the reactant compositions.

The sulfonation agent and the resin dispersion are preferably admixed by feeding the resin dispersion to a mixing and reaction zone containing at least a part of the sulfonation agent. The resin dispersion can be fed into a mixing and reaction zone containing a solution of the sulfonation agent in liquid sulfur dioxide, or separate compositions, i. e., a dispersion of the resin in liquid sulfur dioxide, and the sulfonation agent, or preferably a solution thereof in liquid sulfur dioxide, can be fed separately into a mixing and reaction zone preferably containing an initial charge of liquid sulfur dioxide. The reaction can be carried out in continuous manner by feeding separate streams of the liquid sulfur dioxide-resin dispersion, and of the sulfonation agent, or preferably a solution of sulfonation agent in sulfur dioxide, to a mixing and reaction zone and withdrawing the reacted mixture, e. g., as a stream, from the zone.

The reaction is carried out at a pressure sufficient to maintain a dispersion of the unreacted resin in liquid sulfur dioxide. It may be carried out at atmospheric pressure when employing reaction temperatures at or below −10° C., but at higher temperatures it is carried out at superatmospheric pressure, e. g. in a bomb or autoclave. The sulfonation reaction is exothermic. However, the reaction mixture can be maintained at the desired reaction temperature either by vaporization of a portion of the liquid sulfur dioxide or by external cooling of the reaction mixture.

The sulfonation occurs rapidly with formation of a resin sulfonic acid product which precipitates as granules or particles swollen with liquid sulfur dioxide. The product can be separated from the liquid sulfur dioxide in usual ways, e. g., by filtering, decanting, or centrifuging the mixture. Any unreacted sulfonation agent or other impurities such as sulfuric acid remains, for the most part, dissolved in the liquid sulfur dioxide. The solid resin product may be washed with a small portion of liquid sulfur dioxide or of an ether such as diethyl ether to remove adhering mother liquor, and any wash liquid retained on the product may be removed by vaporization. The water-soluble resin sulfonic acid may thus be obtained directly in a solid granular form of good purity. Since the water-soluble resin sulfonic acids are usually deliquescent, the foregoing steps for separating the same are preferably, but not necessarily, carried out in the absence of moist air, e. g. in a closed system.

The water-soluble ar-vinyltoluene-acrylonitrile copolymer sulfonic acids can be neutralized in usual ways with alkalies, such as ammonia, sodium hydroxide, potassium hydroxide or the like, to form salts thereof. The ammonium and alkali metal salts thus obtained are soluble in water to form true or colloidal solutions thereof. The water-soluble ar-vinyltoluene-acrylonitrile polysulfonates are adapted for use as sizing agents and thickeners for aqueous compositions.

The following examples illustrate ways in which the invention has been practiced, but are not to be construed as limiting its scope. The ar-vinyltoluene used in preparation of the copolymers employed in the examples was a mixture of about 60 percent by weight meta-vinyltoluene and about 40 percent by weight para-vinyltoluene. In the examples, percentages are by weight.

Example 1

A substantially homogeneous dispersion was prepared by stirring together 200 mls. of liquid sulfur dioxide and 25 grams of a copolymer of 96% ar-vinyltoluene and 4% acrylonitrile, that copolymer having a solution viscosity of 7 centipoises, i. e., a solution of the copolymer in nine times its weight of toluene had a viscosity of 7 centipoises at a temperature of 25° C. Over a period of about 13 minutes, the resulting dispersion was added with stirring to a liquid solution of 300 mls. of liquid sulfur dioxide, 2.8 mls. of chlorosulfonic acid, and 9 mls. of liquid sulfur trioxide, at a temperature of −10° C. under reflux at atmospheric pressure. Stirring was continued for 20 minutes. The resulting slurry was filtered and the filter cake was washed with diethyl ether and dried. The resulting ar-vinyltoluene-acrylonitrile copolymer sulfonic acid product was completely soluble in water. One gram of the resulting copolymer sulfonic acid, dissolved in water, required 4.6 mls. of 1.0 N sodium hydroxide solution to effect neutralization. The viscosity at 25° C. of a water solution containing 0.5 percent by weight of the neutral sodium salt of the copolymer sulfonic acid was 3 centipoises.

Example 2

In a series of tests, identified as Tests 1 through 9 in the table, copolymers of ar-vinyltoluene and acrylonitrile were sulfonated. The copolymers employed are characterized in the table by composition in percent by weight (the abbreviations "VT" and "Ac" standing for ar-vinyltoluene and acrylonitrile, respectively), and by solution viscosity, the latter being the viscosity in centipoises at 25° C. of a solution of the copolymer in nine times its weight of toluene. In each test, a substantially homogeneous dispersion was prepared by stirring 5 grams of the respective copolymer starting materials in 100-mls. portions of liquid sulfur dioxide. Separate solutions of sulfonation agent were prepared by admixing 100 mls. of liquid sulfur dioxide and the quantities of chlorosulfonic acid and of liquid sulfur trioxide (symbolized by the formulas $ClSO_3H$ and $SO_3$, respectively) as shown in the table for the various tests. The sulfonations were carried out by feeding concurrently one of the polymer dispersions and the corresponding solution of sulfonation agent into a vessel, initially containing 300 mls. of liquid sulfur dioxide, at a temperature of −10° C., with vigorous stirring. Stirring was continued for about one-half hour after the reaction mixture was complete. In each instant, the resulting slurry was filtered, and the filter cake was washed with diethyl ether and dried. The ar-vinyltoluene-acrylonitrile copolymer sulfonic acid product resulting from each test was tested for solubility in water. The table shows, for each test, the viscosity at 25° C. of a water dispersion of ½ percent by weight of the neutral sodium salt of the resin sulfonic acid products. The table also shows, under "Remarks," the condition of a water dispersion of the resin sulfonate. The products marked "soluble" were substantially free of gels.

| Test | Polymer Composition, Wt. Percent | | Solution Viscosity, Cps. | Sulfonation Agent, Mls. | | Viscosity of ½% Sodium Salt in Water, Cps. | Remarks |
|---|---|---|---|---|---|---|---|
| | VT | Ac | | $ClSO_3H$ | $SO_3$ | | |
| 1 | 95 | 5 | 82.4 | 1.9 | 1.27 | 350 | Some gels. |
| 2 | 95 | 5 | 82.4 | 1.1 | 1.8 | 60 | Soluble. |
| 3 | 96 | 4 | 120.0 | 2.7 | 0.73 | 135 | Do. |
| 4 | 96 | 4 | 120.0 | 1.9 | 1.27 | 122 | Few gels. |
| 5 | 96 | 4 | 120.0 | 1.1 | 1.8 | 88 | Soluble. |
| 6 | 95 | 5 | 345.7 | 1.9 | 1.27 | 470 | Some gels. |
| 7 | 95 | 5 | 345.7 | 1.1 | 1.8 | 255 | Soluble. |
| 8 | 95 | 5 | 727.0 | 1.9 | 1.27 | 5,000 | Some gels. |
| 9 | 95 | 5 | 727.0 | 1.1 | 1.8 | 740 | Soluble. |

These and similar data were employed as a basis for the construction of the figure of the drawing. Tests 2, 5, 7, and 9 fall below line ABC of the drawing while Tests 1, 3, 4, 6 and 8 fall between lines ABC and DEF.

In place of the particular copolymers shown in the foregoing examples, there can be employed copolymers containing from about 90 to about 98 percent by weight ar-vinyltoluene and correspondingly from about 10 to about 2 percent by weight acrylonitrile and substantially the same results are obtained, e. g., water-soluble resin sulfonates are produced.

When, for purposes of contrast, the procedural steps of the above tests were carried out using (instead of the ar-vinyltoluene copolymers) copolymers of 90% styrene and 4% acrylonitrile, gelled products were obtained that were not truly soluble in water.

I claim:

1. In a method for the preparation of water-soluble resin sulfonates the steps of forming a substantially homogeneous dispersion in liquid sulfur dioxide of a copolymer of from about 90 to about 98 percent by weight of ar-vinyltoluene and correspondingly from about 10 to about 2 percent by weight of acrylonitrile, mixing the dispersion with a total of at least 0.7 molecular equivalent of a sulfonation agent per molecular equivalent of monomeric compounds chemically combined in the copolymer, the sulfonation agent consisting of from about 10 to about 90 mole percent chlorosulfonic acid and correspondingly from about 90 to about 10 mole percent sulfur trioxide, in the presence of liquid sulfur dioxide as a reaction medium, the proportion of sulfur dioxide being such that the resin sulfonate product is not more than 5 percent by weight of the whole mixture, and maintaining the mixture at a reaction temperature not higher than 40° C., the starting copolymer of ar-vinyltoluene and acrylonitrile being one whose solution in nine times its weight of toluene has a viscosity in centipoises at 25° C. not greater than that represented by a point on the line DEF in the accompanying drawing corresponding to the mole percent chlorosulfonic acid in the sulfonation agent.

2. In a method for the preparation of water-soluble resin sulfonates, the steps of forming a substantially homogeneous dispersion in liquid sulfur dioxide of a copolymer of from about 90 to about 98 percent by weight of ar-vinyltoluene and correspondingly from about 10 to about 2 percent by weight of acrylonitrile, mixing the dispersion with a total of from about 0.8 to about 2 molecular equivalents of a sulfonation agent per molecular equivalent of monomeric compounds chemically combined in the copolymer, the sulfonation agent consisting of from about 10 to about 90 mole percent chlorosulfonic acid and correspondingly from about 90 to 10 mole percent sulfur trioxide, in the presence of liquid sulfur dioxide as a reaction medium, the proportion of sulfur dioxide being such that the resin sulfonate product is not more than 3 percent by weight of the whole mixture, and maintaining the mixture at a reaction temperature between about −10° and 30° C., the starting copolymer of ar-vinyltoluene and acrylonitrile being one whose solution in nine times its weight of toluene has a viscosity in centipoises at 25° C. not greater than that represented by a point on the line ABC in the accompanying drawing corresponding to the mole percent chlorosulfonic acid in the sulfonation agent.

3. In a method for the preparation of water-soluble resin sulfonates, the steps of forming a substantially homogeneous dispersion in liquid sulfur dioxide of a copolymer of from about 90 to about 98 percent by weight of ar-vinyltoluene and correspondingly from about 10 to about 2 percent by weight of acrylonitrile, that dispersion containing up to about 10 percent by weight of the copolymer, forming a solution in liquid sulfur dioxide of a sulfonation agent consisting of from about 10 to about 90 mole percent chlorosulfonic acid and correspondingly from about 90 to about 10 mole percent sulfur trioxide, that solution containing a volume of liquid sulfur dioxide at least equal to the volume of sulfonation agent, placing the sulfonation agent solution in a mixing and reaction zone, admixing and reacting the copolymer dispersion with the sulfonation agent solution in the mixing and reaction zone in proportions corresponding to from about 0.8 to about 2 molecular equivalents of sulfonation agent per molecular equivalent of monomeric compounds chemically combined in the copolymer, the proportion of liquid sulfur dioxide being such that there is in the resulting mixture not more than 3 percent by weight of the resin sulfonate product, while maintaining the mixture at a reaction temperature between about −10° and 30° C., the starting copolymer of ar-vinyltoluene and acrylonitrile being one whose solution in nine times its weight of toluene has a viscosity in centipoises at 25° C. not greater than that represented by a point on the line ABC in the accompanying drawing corresponding to the mole percent chlorosulfonic acid in the sulfonation agent.

4. In a method for the preparation of water-soluble resin sulfonates, the steps of forming a substantially homogenous dispersion in liquid sulfur dioxide of a copolymer of from about 90 to about 98 percent by weight of ar-vinyltoluene and correspondingly from about 10 to about 2 percent by weight of acrylonitrile, that dispersion containing up to about 10 percent by weight of the copolymer, forming a solution in liquid sulfur dioxide of a sulfonation agent consisting of from about 10 to about 90 mole percent chlorosulfonic acid and correspondingly from about 90 to about 10 mole percent sulfur trioxide, that solution containing a volume of liquid sulfur dioxide at least equal to the volume of sulfonation agent, concurrently feeding separate streams of the copolymer dispersion and of the sulfonation agent solution to a mixing and reaction zone in proportions corresponding to from about 0.8 to about 2 molecular equivalents of sulfonation agent per molecular equivalent of monomeric compounds chemically combined in the copolymer, the proportion of liquid sulfur dioxide being such that the resulting resin sulfonate product is not more than 3 percent by weight of the whole mixture, and maintaining the resulting mixture at a reaction temperature between about −10° and about 30° C., the starting copolymer of ar-vinyltoluene and acrylonitrile being one whose solution in nine times its weight of toluene has a viscosity at 25° C. not greater than that represented by a point on the line ABC in the accompanying drawing corresponding to the mole percent chlorosulfonic acid in the sulfonation agent.

5. In a method for the preparation of water-soluble resin sulfonates, the steps of forming a substantially homogeneous dispersion in liquid sulfur dioxide of a copolymer of from about 90 to about 98 percent by weight of ar-vinyltoluene and correspondingly from about 10 to about 2 percent by weight of acrylonitrile, that dispersion containing from about 3 to about 5 percent by weight of the copolymer, forming a solution in liquid sulfur dioxide of a sulfonation agent consisting of from about 10 to about 90 mole percent chlorosulfonic acid and correspondingly from about 90 to about 10 mole percent sulfur trioxide, that solution containing from about 3 to about 5 percent by weight of sulfonation agent, concurrently feeding to a mixing and reaction zone initially containing liquid sulfur dioxide separate streams of the copolymer dispersion and of the sulfonation agent solution in proportions corresponding to from about 1.2 to about 1.6 molecular equivalents of sulfonation agent per molecular equivalent of monomeric compounds chemically combined in the copolymer, the proportion of liquid sulfur dioxide being such that the resulting resin sulfonate product is between about 0.5 and about 3 percent by weight of the whole mixture, and maintaining the resulting mixture at a temperature of about −10° C., the starting copolymer of ar-vinyltoluene and acrylonitrile being one whose solution in nine times its weight of toluene has a viscosity in centipoises at 25° C. not greater than that represented by a point on the line ABC in the accompanying drawing corresponding to the mole percent chlorosulfonic acid in the sulfonation agent.

References Cited in the file of this patent
UNITED STATES PATENTS

| | | |
|---|---|---|
| 2,102,179 | Hopff | Dec. 14, 1937 |
| 2,646,423 | Wehr | July 21, 1953 |
| 2,691,644 | Roth | Oct. 12, 1954 |